(12) United States Patent
Matsuda

(10) Patent No.: US 7,597,024 B2
(45) Date of Patent: Oct. 6, 2009

(54) GEAR-SHIFT DEVICE OF MANUAL TRANSMISSION

(75) Inventor: Kenji Matsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 10/562,482

(22) PCT Filed: Jun. 25, 2004

(86) PCT No.: PCT/JP2004/009387

§ 371 (c)(1),
(2), (4) Date: Dec. 27, 2005

(87) PCT Pub. No.: WO2005/003602

PCT Pub. Date: Jan. 13, 2005

(65) Prior Publication Data

US 2006/0169083 A1    Aug. 3, 2006

(30) Foreign Application Priority Data

Jul. 2, 2003   (JP) .............................. 2003-190153

(51) Int. Cl.
   *F16H 59/04*   (2006.01)
(52) U.S. Cl. ................. 74/473.36; 74/473.37
(58) Field of Classification Search .............. 74/473.11, 74/335, 473.36, 473.37, 519, 523
   See application file for complete search history.

(56) References Cited

U.S. PATENT DOCUMENTS 3,431,791 A * 3/1969 Pierre ..................... 74/473.24
5,566,579 A * 10/1996 Willford et al. ............... 74/335
6,467,598 B2 * 10/2002 Jackson et al. ........... 192/53.34

FOREIGN PATENT DOCUMENTS

| JP | 2-240455 | | 9/1990 |
| JP | 3-130467 | | 12/1991 |
| JP | 3-130956 | | 12/1991 |
| JP | 8-326913 | | 12/1996 |
| JP | 2000-18381 | | 1/2000 |
| JP | 2001116141 A | * | 4/2001 |
| JP | 2003-14114 | | 1/2003 |

* cited by examiner

*Primary Examiner*—Richard W L Ridley
*Assistant Examiner*—Alan B Waits
(74) *Attorney, Agent, or Firm*—Westerman, Hattori, Daniels & Adrian, LLP.

(57) ABSTRACT

A gear-shifting device for a manual transmission, in which the operational force applied at the change-lever L in the shift operation is transmitted selectively to actuate a synchro-sleeve for a gear shift, comprises a shift arm 53, which is rotatable in correspondence to the shift operation of the change-lever L, and a 1st-2nd speed shift piece 41, which is in contact with the shift arm 53 and is capable of shifting in response to the rotation of the shift arm 53. In the gear-shifting device, the shift arm 53 has heteromorphous cams at its contacting part, which is in contact with the 1st-2nd speed shift piece 41, and the heteromorphous cams are designed in a compound arc figure, which comprises a plurality of combined arcs having different curvature radii. As a result, while the shift arm 53 is rotating in correspondence to the shift operation, the distance between the contacting part and the rotational axis of the shift arm 53 varies to change the leverage effective between the change-lever L and the contacting part.

6 Claims, 7 Drawing Sheets

GEAR-SHIFT DEVICE OF MANUAL TRANSMISSION

FIELD OF THE INVENTION

The present invention relates generally to a gear-shifting device for a manual transmission, which device actuates a shift fork to bring into engagement selectively a clutch that establishes a power transmission through a corresponding gear train in gear-shifting control. The present invention relates particularly to a gear-shifting device in which a force applied in operating the change-lever manually is transmitted to a shift fork to bring a corresponding clutch into engagement in the manual transmission.

BACKGROUND OF THE INVENTION

Generally, in a manual transmission (manual gear-shift transmission), when the driver operates the change-lever manually, the force applied by the driver in the operation is transmitted through a gear-shifting device to a shift fork, so that the shift fork sets a corresponding clutch (for example, a synchromesh mechanism) into engagement, establishing a desired speed change ratio for the transmission. Such clutches are arranged over either of the two parallel shafts of the transmission, in correspondence to permanently meshing gear trains of various gear ratios, which gear trains are disposed over the two parallel shafts in parallel with one another.

Such a manual transmission comprises a system (gear-shifting device) that transmits the operational force (shifting force) applied by the driver at the change-lever. For example, Japanese Laid-Open Patent Publication No. 2003-14114 discloses such a system that comprises a shift selector shaft, a shift arm and a plurality of shift pieces. In this case, the shift selector shaft, which is equipped with the shift arm, is movable in its axial direction and rotatable axially in correspondence to the operation of the change-lever, which is connected through connecting members like a shift cable. Shift forks are provided in the same number as the gear trains that are used as the speed change ratios of the transmission, and each shift fork has, as a one-piece body, a shift fork shaft, on which a corresponding shift fork is provided. When the driver operates the change-lever appropriately, the shift arm is shifted in the axial direction of the shift selector shaft and engages selectively with one of the shift pieces, and then the shift arm is rotated around the shift selector shaft to shift the corresponding shift fork shaft in its longitudinal axial direction. As a result, the operational force applied at the change-lever is transmitted selectively to the corresponding one of the shift forks for a gear shift.

Into such a clutch mechanism, a synchromesh mechanism is adopted to achieve a smooth clutching operation for a gear shift, which is controlled by the operation of the change-lever. In this case, it is desirable to lighten the burden of the driver in operating the change-lever, so there are a plurality of methods of reducing the force required for operating the change-lever and for transmitting this reduced operational force securely to the shift fork to achieve a gear shift. For example, there is a method for increasing the leverage or stroke of the change-lever. Another method tries to increase the capacity of the synchromesh mechanism to reduce the load generated in the clutch during the synchronization.

However, there is a limit to the increase of the leverage that is effected by increasing the stroke of the change-lever because the installation space of the change-lever in the interior of a vehicle is limited. Also, it is not desirable from the point of view of the driver's maneuverability of the change-lever. Moreover, if the leverage is increased, then the stroke of the shift fork must be reduced in inverse proportion. This may result in an impairment to the secure clutching operation. On the other hand, the increasing of the synchronization capacity results in an increase in the number of the parts constituting the transmission and can lead to an increase in the manufacturing cost of the transmission.

SUMMARY OF THE INVENTION

It is an object of the present invention to provide a gear-shifting device for a manual transmission, which device has a variable leverage to improve the maneuverability of the change-lever, which has an appropriate and secure stroke for a smooth shift operation.

A gear-shifting device for a manual transmission according to the present invention is to transmit the operational force applied at the change-lever in a shift operation so as to actuate selectively a synchro-sleeve for a gear shift. The gear-shifting device comprises a shift arm, which is rotatable in correspondence to the shift operation of the change-lever, and a shift piece, which is in contact with the shift arm and is capable of shifting in response to the rotation of the shift arm. Furthermore, the shift arm has heteromorphous cams at its contacting part, which is in contact with the shift-piece. While the shift arm is rotating in correspondence to the shift operation, the distance between the contacting part and the rotational axis of the shift arm varies to change the leverage effective between the change-lever and the contacting part.

For the above described gear-shifting device, it is preferable that the manual transmission comprise a plurality of speed-change gears and a synchromesh mechanism, which synchronizes a synchro-sleeve and a speed-change gear by pushing the synchro-sleeve onto the speed-change gear. In addition, preferably, the gear-shifting device is designed such that the leverage becomes maximum at the time of the synchronization by the synchromesh mechanism.

Furthermore, in the gear-shifting device, the heteromorphous cams preferably have a compound arc figure which comprises a plurality of combined arcs having different curvature radii. By this arrangement, the leverage can be made to change after the synchronization when the contacting part of the shift arm transits from the surface defined by one arc to that defined by another arc among these arcs in response to the further rotation of the shift arm.

Because the top part of the shift arm, which engages with the shift piece to shift a corresponding shift fork shaft with a shift fork, is provided with the compound arc figure, which comprises a plurality of combined arcs having different curvature radii, the leverage effective between the change-lever and the shift fork is changeable while the shift arm is being rotated (and the shift fork is being shifted) by the operation of the change-lever.

Therefore, in the initial stage of the operation of the change-lever, the leverage is set at a relatively large value to make a relatively small operational force applied by the driver act on the shift fork as a large force to ensure the synchronization of the synchromesh mechanism. On the other hand, this large force acting on the shift fork is no longer necessary after the synchronization, so the leverage is designed to change to a lower value, halfway through the shift operation executed by the driver. In this way, the rate of the displacement of the shift fork to that of the change-lever is increased, halfway through the operation, for the complete actuation of the shift fork. Therefore, the stroke of the change-lever for the completion of the shift operation in the gear-shifting device according to the present invention is still made equal to that of a prior-art gear-shifting device, so the present invention does not require an increase in the installation space of the change-lever especially in the interior of the vehicle.

In the above described gear-shifting device, the point where the leverage changes from a larger value to a smaller value during the shift operation can be set to come after the synchronization of the synchromesh mechanism. In this way, the rate of the displacement of the shift fork to that of the change-lever is increased after the synchronization to quickly bring the gear into engagement. As a result, so-called "two-step engaging load", which is a reaction generated at the time of the gear meshing in the synchromesh mechanism and which is uncomfortable to the driver who is operating the change-lever, is reduced in frequency and in magnitude.

DESCRIPTION OF THE PREFERRED EMBODIMENTS

Figure 1:
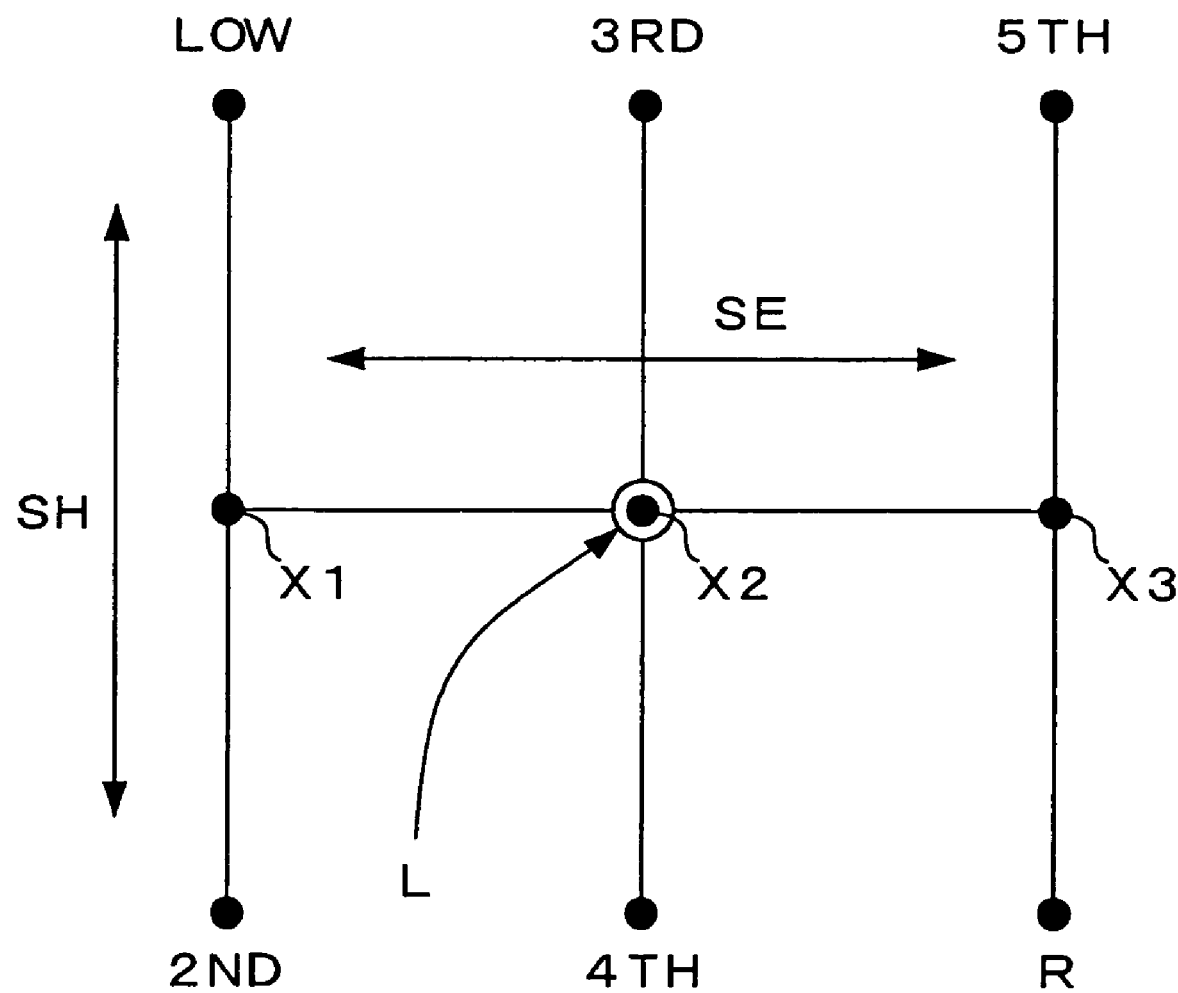
FIG. 1 is a diagram describing patterns for the operation of a change-lever.

Now, a preferred embodiment of gear-shifting device for a manual transmission according to the present invention is described in reference to FIGS. 1~7.

This manual transmission, when its Low, 2nd~5th or Reverse clutch is selectively engaged, transmits the driving force of an engine selectively through a gear train with a different speed change ratio. For a gear shift, the driver manually operates the change-lever L provided at the driver seat. The following is a description of the mechanism to achieve a gear shift.

The change-lever L, which is used to select one of the 1st~5th speed change ratios and reverse ratio (hereinafter referred to as "R speed"), is operated in the patterns shown in FIG. 1. If the change-lever L is operated in the direction indicated by SE in the drawing, then it can be positioned at one of the three selecting positions: 1st-2nd speed selecting position X1, 3rd-4th speed selecting position X2, and 5th-R speed selecting position X3. Then, while the change-lever L is at the 1st-2nd speed selecting position X1, if it is shifted in the direction indicated by SH, which is perpendicular to the above mentioned operational direction SE, either the 1st speed position LOW or the 2nd speed position 2ND is selectable. Likewise, while the change-lever L is at the 3rd-4th speed selecting position X2, if it is shifted in the direction indicated by SH, either the 3rd speed position 3RD or the 4th speed position 4TH is selectable. Also, at the 5th-R speed selecting position X3, if the change-lever L is shifted in the direction indicated by SH, either the 5th speed position 5TH or the reverse position R is selectable.

Figure 2:
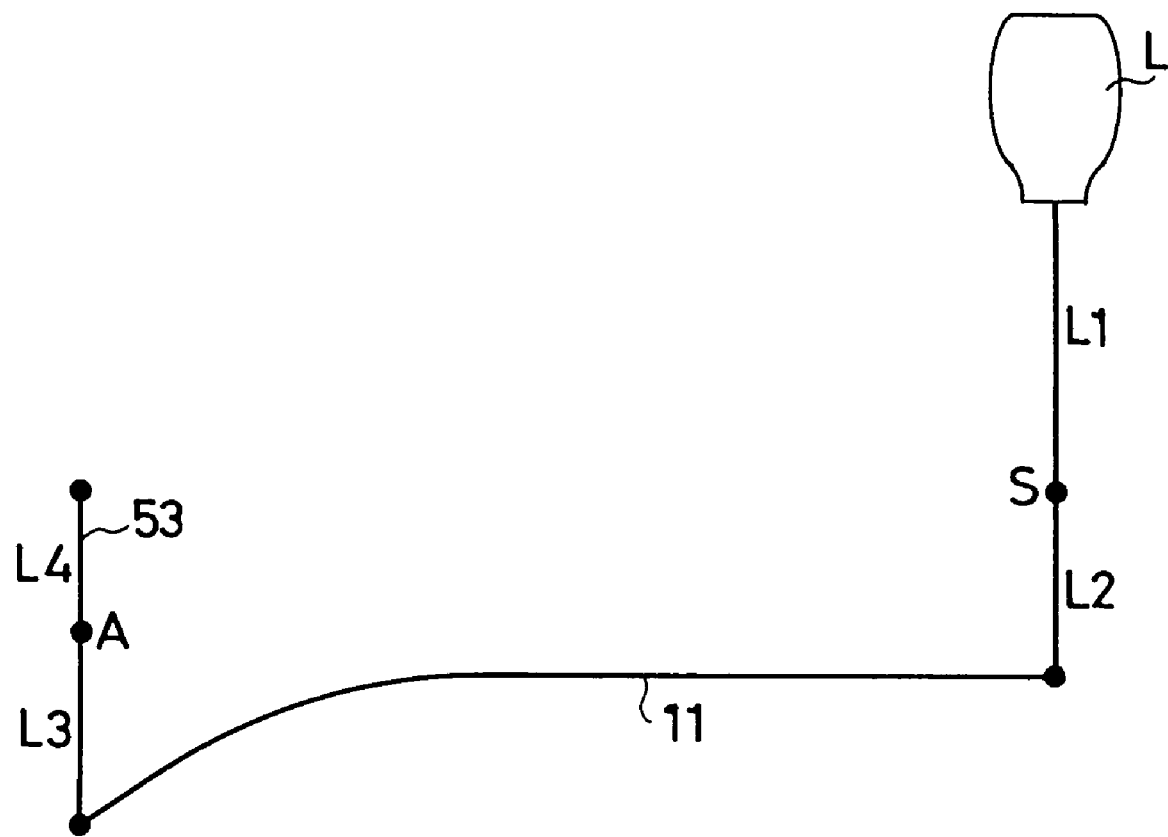
FIG. 2 is a schematic diagram describing a system that transmits the operational force applied on the change-lever.

When the driver operates the change-lever L to any of the above mentioned speed change positions, the change-lever L swings around the position indicated by point S in FIG. 2 as fulcrum. As a result, the force applied on the change-lever L by the driver in the operation is transmitted through a shift cable 11 to a shift arm 53, which rotates around its central axis A. Therefore, the system to transmit the operational force from the change-lever L to the shift arm 53 comprises a plurality of levers, which have leverages of L1/L2 and L3/L4, respectively, a shift arm 53 (the part indicated by L4), the above mentioned shift cable 11, and parts for connecting these components.

Figure 3:
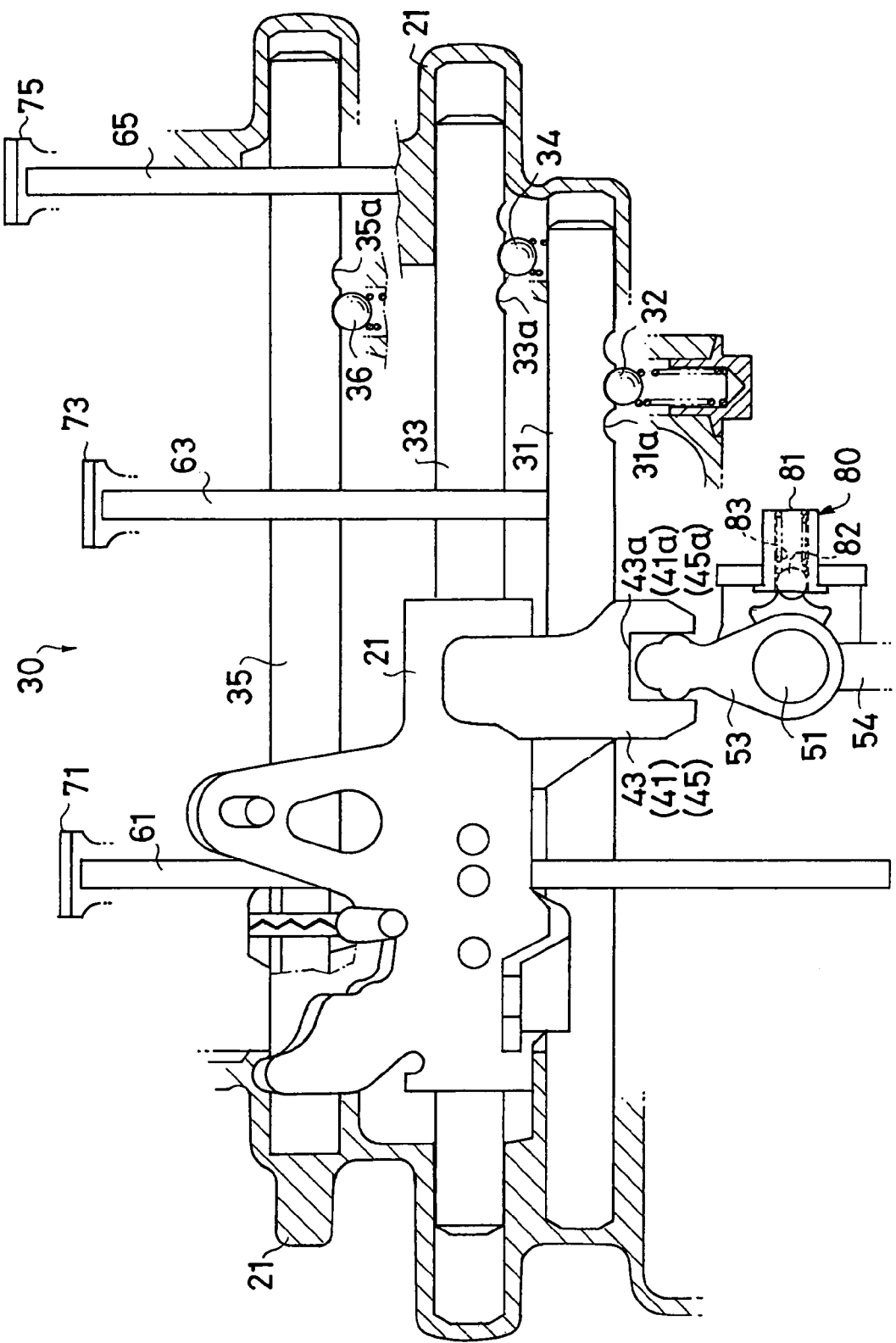
FIG. 3 is a sectional plan view showing components of the system that transmits the operational force in a manual transmission equipped with a gear-shifting device according to the present invention.

FIG. 3 shows the system that transmits the operational force (shifting force), which comprises the gear-shifting device according to the present invention. This operational force transmitting system 30, which is provided in the transmission case 21, comprises a 1st-2nd speed shift fork shaft 31, a 3rd-4th speed shift fork shaft 33 and a 5th-R speed shift fork shaft 35, which are movable longitudinally and axially. The 1st-2nd speed shift fork shaft 31 has detent grooves 31a, which constitute a detent mechanism 32. By this mechanism, the 1st-2nd speed shift fork shaft 31 is positioned at any one of the three positions, LOW, Neutral, and 2ND. Likewise, the 3rd-4th speed shift fork shaft 33 and the 5th-R speed shift fork shaft 35 have detent grooves 33a and 35a, respectively, which constitute detent mechanisms 34 and 36, respectively. By these mechanisms, the 3rd-4th speed shift fork shaft 33 is positioned at any one of the three positions, 3RD, Neutral, and 4TH, and the 5th-R speed shift fork shaft 35 at either of the two positions, 5TH and Reverse (R), respectively.

Furthermore, the 1st-2nd speed shift fork shaft 31, the 3rd-4th speed shift fork shaft 33 and the 5th-R speed shift fork shaft 35 are connected to a 1st-2nd speed shift piece 41, a 3rd-4th speed shift piece 43 and a 5th-R speed shift piece 45, respectively, which are supported in the transmission case 21. These shift pieces 41, 43 and 45 are movable axially together with their respective shift fork shafts 31, 33 and 35. FIG. 3 shows only the 3rd-4th speed shift piece 43 because this drawing shows a condition that the shift pieces 41, 43 and 45 are positioned one over another in the direction perpendicular to the paper carrying the drawing.

Each shift piece 41, 43 or 45 is provided with an approximately U shaped selector groove 41a, 43a or 45a, respectively, and one of these selector grooves 41a, 43a and 45a is engaged with the top part of the shift arm 53, which will be described in detail later. When the change-lever L is swung in the SE direction shown in FIG. 1, each selector groove 41a, 43a or 45a selectively and correspondingly comes into contact with the top part of the shift arm 53. If the change-lever L is swung in the SH direction in FIG. 1, then the shift piece 41, 43 or 45 that has the selector groove 41a, 43a or 45a selectively engaged with the shift arm 53 is shifted with the corresponding shift fork shaft 31, 33 or 35 in the axial direction.

The 1st-2nd speed shift fork shaft 31, the 3rd-4th speed shift fork shaft 33 and the 5th-R speed shift fork shaft 35 are provided with a 1st-2nd speed shift fork 61, a 3rd-4th speed shift fork 63, and a 5th-R speed shift fork 65, respectively. The 1st-2nd speed shift fork 61 is engaged with a 1st-2nd speed synchro-sleeve 71, which actuates a 1st clutch or a 2nd clutch (not shown). The 3rd-4th speed shift fork 63 is engaged with a 3rd-4th speed synchro-sleeve 73, which actuates a 3rd clutch or a 4th clutch (not shown). The 5th-R speed shift fork 65 is engaged with a 5th-R speed synchro-sleeve 75, which actuates a 5th clutch or a reverse clutch (not shown).

With this arrangement, the appropriate operation of the change-lever L makes the shift arm 53 to engage with any of the selector grooves 41a, 43a and 45a of the 1st-2nd speed shift piece 41, the 3rd-4th speed shift piece 43 and the 5th-R speed shift piece 45 and then makes the engaged 1st-2nd speed shift fork shaft 31, 3rd-4th speed shift fork shaft 33 or 5th-R speed shift fork shaft 35 to shift in its axial direction. As a result, the 1st~5th clutches and the reverse clutch are selectively actuated to establish the corresponding speed change ratios, LOW~R.

Figure 4:
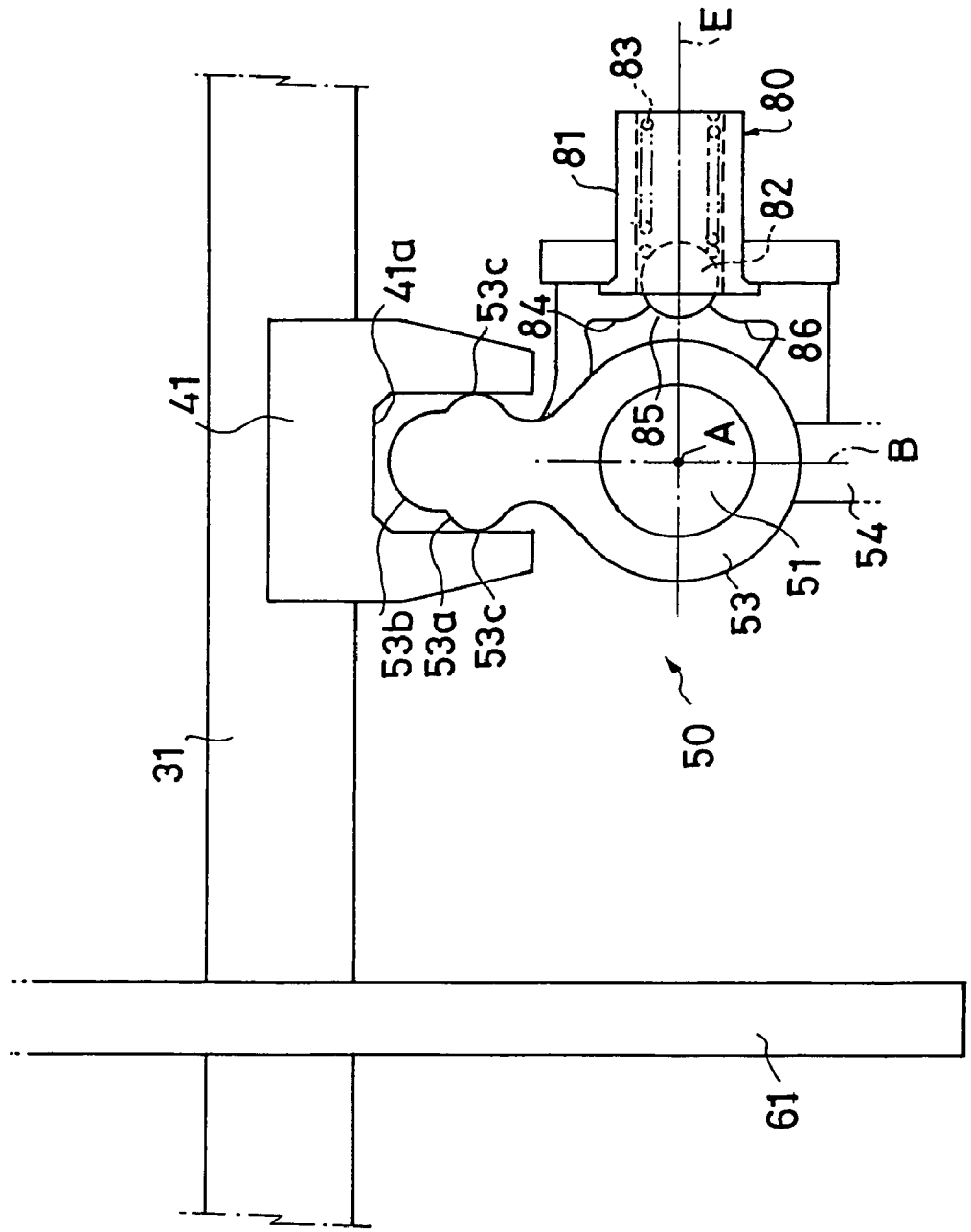
FIG. 4 is a view showing parts of the gear-shifting device and parts surrounding the device.

Now, in reference to FIG. 4, the gear-shifting device according to the present invention is described for a case where the operational force is transmitted from the shift arm 53 to the 1st-2nd speed shift fork 61 as an example. As shown in the drawing, the gear-shifting device 50 comprises the above mentioned 1st-2nd speed shift piece 41, a shift selector shaft 51, the above mentioned shift arm 53, and a detent mechanism 80. The shift arm 53 is provided with circular holes, through which the shift selector shaft 51 is placed extending in the direction perpendicular to the paper carrying the drawing. The shift arm 53 is fixed on the shift selector shaft 51 by a bolt 54, which is screwed into a flank of the shift selector shaft 51.

The shift selector shaft 51 shifts in the longitudinal axial direction (the direction perpendicular to the paper carrying the drawing), when the change-lever L is swung in the SE direction in FIG. 1 and rotates clockwise or counterclockwise around the axis A indicated in the drawing when the change-lever L is swung in the SH direction in FIG. 1. In other words, when the change-lever L is swung in the SE direction shown in FIG. 1, the shift arm 53 is shifted in the direction perpendicular to the paper. On the other hand, when the change-lever L is swung in the SH direction in FIG. 1, the shift arm 53 is rotated around the axis A.

As shown in FIG. 4, the shift arm 53 at its neutral position is in contact with the 1st-2nd speed shift piece 41 by the contacting part 53c thereof. Therefore, when the shift arm 53 rotates around the axis A, the operational force is transmitted from the shift selector shaft 51 through the contacting part 53c to the 1st-2nd speed shift piece 41, shifting the 1st-2nd speed shift fork shaft 31 axially. The shift arm 53 at its top part (where it engages with the 1st-2nd speed shift piece 41) has a compound arc figure (heteromorphous cams). In the neutral position shown in FIG. 4, the arc portion 53a (near the root of the protrusion) that is the closer of the arc portions to the shift selector shaft 51 is in contact with the shift piece 41 through the contacting part 53c. However, if the shift arm 53 rotates around the axis A, the contacting part 53c of the shift arm 53 in contact with the shift piece 41 shifts to the arc portion 53b (at the top of the protrusion) that is the closer of the arc portions to the 1st-2nd speed shift fork shaft 31, transmitting the operational force from the change-lever L to the shift piece 41. This will be described in detail later.

The top part of the shift arm 53 is defined not by partially superimposing complete circles without any bias, but rather by partially cutting arcs so that the arcs have partially flattened sections. These partially flattened arcs are to maintain a clearance between the shift arm 53 and the shift piece 41 and yet to shift the 1st-2nd speed shift fork shaft 31 axially by a sufficient distance when the shift arm 53 rotates.

Furthermore, the shift arm 53 is provided with a detent mechanism 80, which comprises a flanged retaining tube 81, a ball 82, a spring 83, and detent grooves 84, 85 and 86. The retaining tube 81 has an axis E that is perpendicular to the axis of the shift selector shaft 51. The ball 82 is held inside the retaining tube 81 so that it can move along the axis E of the retaining tube 81. The spring 83 is also provided inside the retaining tube 81, so that it biases the ball 82 toward the shift arm 53. The three detent grooves 84, 85 and 86 are provided circumferentially on the shift arm 53 at even intervals, so each of them can engage individually with the ball 82.

The detent mechanism 80 defines angular positions (where the ball 82 enters the right or left detent groove 84 or 86, respectively) for the shift arm 53, which is turned clockwise and counterclockwise from its neutral position (where the ball 82 is in the detent groove 85) shown in FIG. 4. When the shift arm 53 is turned around the axis A for a predetermined angle counterclockwise (until the ball 82 enters the detent groove 86) from the neutral position, the 1st-2nd speed shift fork shaft 31 is shifted leftward (with the 1st-2nd speed shift fork 61) in FIG. 4, engaging the 1st clutch. On the other hand, when the shift arm 53 is turned around the axis A for a predetermined angle clockwise (until the ball 82 enters the detent groove 84) from the neutral position, the 1st-2nd speed shift fork shaft 31 is shifted rightward (with the 1st-2nd speed shift fork 61) in FIG. 4, engaging the 2nd clutch.

When the change-lever L is operated to the 2ND position, the shift arm 53 is rotated to engage the 2nd clutch. Now, the movement of the shift arm 53 and the 1st-2nd speed shift piece 41 being effected in this instance is described chronologically in reference to FIGS. 5A, 5B, 5C and 5D.

Figure 5A:
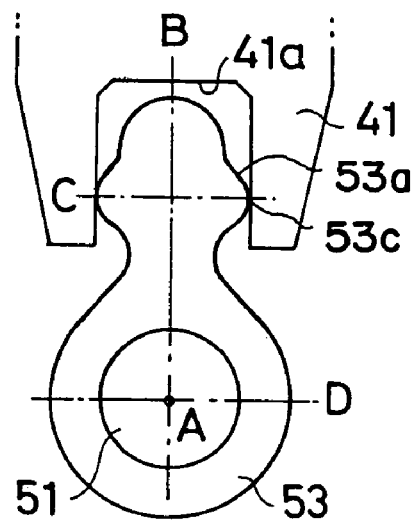
FIGS. 5A, 5B, 5C and 5D are step-by-step views showing chronologically the rotation of the shift arm during the shift operation, which arm is provided in the gear-shifting device.

In the neutral position, as shown in FIG. 5A, the right and left arc portions 53a of the top part of the shift arm 53, which arc portions 53a are located closer to the shift selector shaft 51, are in contact with or in proximity to the right and left walls of the approximately U shaped selector groove 41a of the shift piece 41, at the contacting part 53c of the shift arm 53.

Figure 5C:
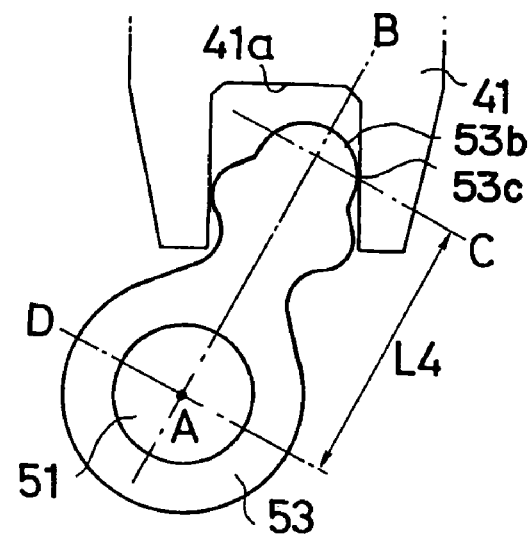
Figure 5B:
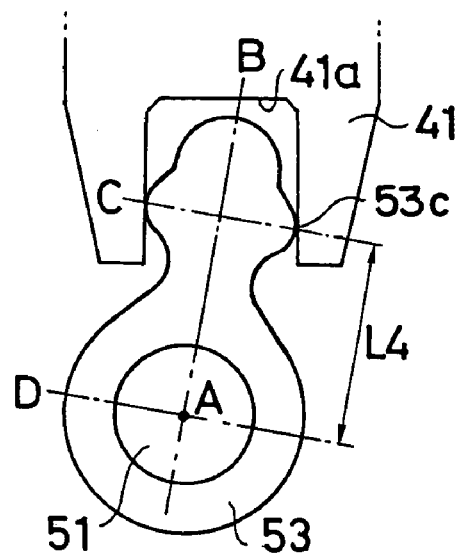

When the driver starts to operate the change-lever L to the 2ND position, the shift arm 53 starts to rotate clockwise around the axis A as shown in FIG. 5B. In this instance, the operational force applied at the change-lever L is transmitted to the shift piece 41 through the contacting part 53c between the shift arm 53 and the shift piece 41, shifting the shift piece 41 rightward in the drawing.

When the change-lever L is operated further toward the 2ND position, increasing the displacement of the change-lever L, the shift arm 53 rotates further clockwise from the condition shown in FIG. 5B to that shown in FIG. 5C. In this instance, the contacting part 53c of the top part of the shift arm 53, which part is in contact with the shift piece 41, shifts to the arc portion 53b that is the farther of the arc portions from the rotational axis A of the shift arm 53. As a result, the operational force from the change-lever L is transmitted to the shift piece 41 through this new contacting part 53c, which pushes the wall of the shift piece 41, shifting the shift piece 41 further rightward in the drawing. In the drawings, line B extends radially from the rotational axis A of the shift arm 53 through the center of the top part of the shift arm 53, and line C that extends through the contacting part 53c and line D that extends through the rotational axis A are perpendicular to line B. Here, the length L4 (that corresponds to length L4 in FIG. 2) defined as the distance between line C and line D is longer in the condition shown in FIG. 5C than in FIG. 5B by the distance that the contacting part 53c has shifted in this transition.

Figure 5D:
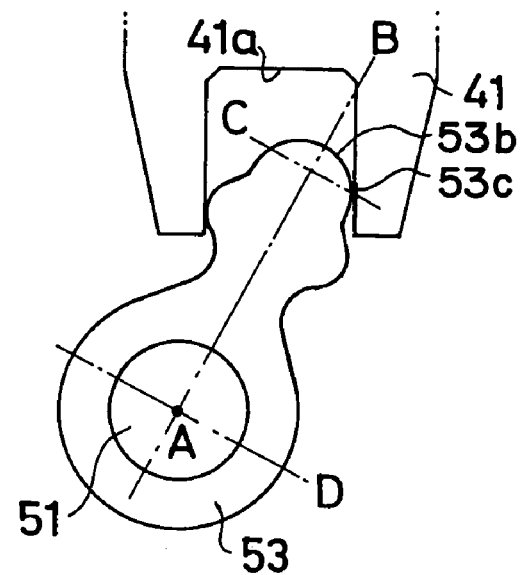

If the change-lever L is operated further to the 2ND position, then the shift arm 53 rotates clockwise and stops at the predetermined angular position that is defined by the detent mechanism 80 as shown in FIG. 5D. At this point, the displacement of the change-lever L has reached its maximum (full stroke). Correspondingly, the 1st-2nd speed shift fork shaft 31 has shifted by the predetermined distance axially, so the 1st-2nd speed shift fork 61, which is mounted on the 1st-2nd speed shift fork shaft 31, engages with the 1st-2nd speed synchro-sleeve 71, which engages the 2nd clutch.

Here, the leverage (lever ratio) R from the change-lever L to the shift arm 53 for the change-lever L to rotate the shift arm 53 is described as follows by using the lengths L1~L4 shown in FIG. 2.

$$R=(L1 \times L3)/(L2 \times L4)$$

In this equation, only length L4 is a variable, which changes during the period from the start to the completion of a shift operation, and the others L1~L3 are constants. Therefore, the leverage R varies in dependence only on length L4 during the shift operation. While the leverage R is relatively high, the force required for the operation of the change-lever L is inversely small, reducing the burden of the driver. However, the displacement of the shift piece 41 (and the synchro-sleeve 71) also becomes inversely small.

Figure 6:
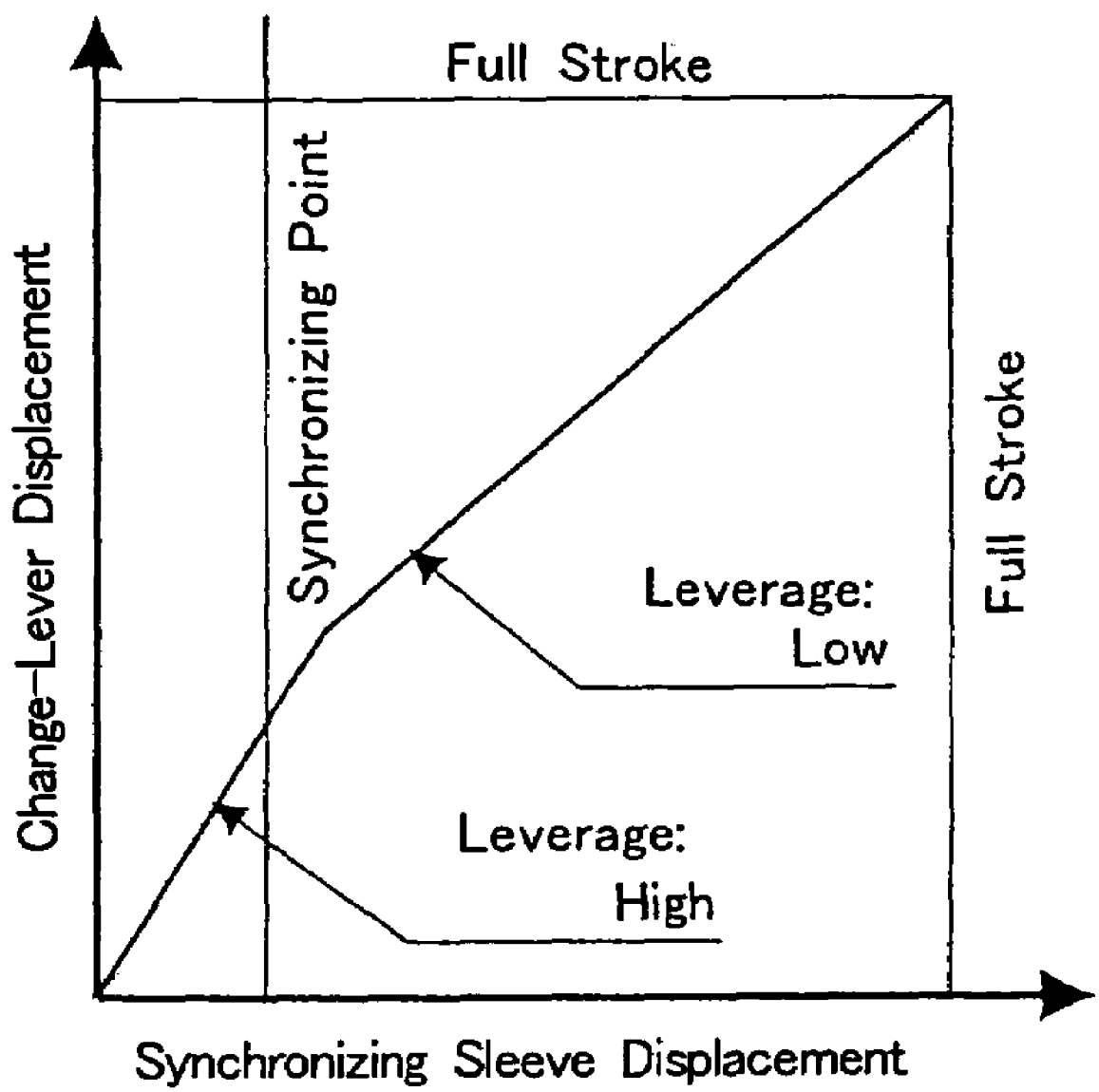
FIG. 6 is a graph describing a relation between the stroke of the synchro-sleeve and that of the change-lever, which strokes are observed during the shift operation in the gear-shifting device according to the present invention.

FIG. 6 describes how the leverage (lever ratio) R changes while the operational force is being transmitted from the shift arm 53 to the 1st-2nd speed shift fork 61 as the shift operation progresses with the driver's operation of the change-lever L. In this graph, the horizontal axis represents the displacement of the synchro-sleeve 71 while the vertical axis represents the displacement of the change-lever L, which is operated by the driver to actuate the synchro-sleeve 71. The leverage R is represented by the slant line in the graph.

In the condition shown in FIG. 5B (where the arc portion 53a is in contact), length L4 is comparatively short, so the leverage R is large. Therefore, the inclination of the line that represents the relation between the displacement of the synchro-sleeve 71 and that of the change-lever L shown in FIG. 6 is comparatively large. On the other hand, when the contacting part 53c between the top part of the shift arm 53 and the shift piece 41 shifts from arc portion 53a to arc portion 53b, the inclination of the line shown in FIG. 6 becomes smaller.

As shown in FIG. 6, the point where the change of the leverage R occurs is set to come after the point of the synchronization of the synchro-sleeve 71, which has shifted for an actuation. This point of the synchronization indicates the position in the stroke of the synchro-sleeve 71 where the synchromesh mechanism is actuated to push the corresponding gear for a gear shift, generating a friction for the synchronization. As shown in the graph, the leverage R at the synchronization point is comparatively large. Therefore, it is enough to apply a relatively small force at the change-lever L to achieve a relatively large force acting on the 1st-2nd speed shift fork 61 for generating a friction for the synchronization by the synchromesh mechanism.

After the completion of the synchronization by the synchromesh mechanism, such a large force acting on the synchro-sleeve 71 is no longer needed, but only a comparatively small force is needed to further shift the synchro-sleeve 71. For this reason, the leverage changes to a small value before the further displacement of the change-lever L is made. Because of this decreased leverage, the relatively short displacement of the change-lever L thereafter for the completion of the stroke achieves a sufficient displacement of the synchro-sleeve 71 to effect a gear shift. In this way, the stroke of the change-lever L required for a gear shift in the gear-shifting device according to the present invention can be made equal to that of a prior-art gear-shifting device.

Figure 7:
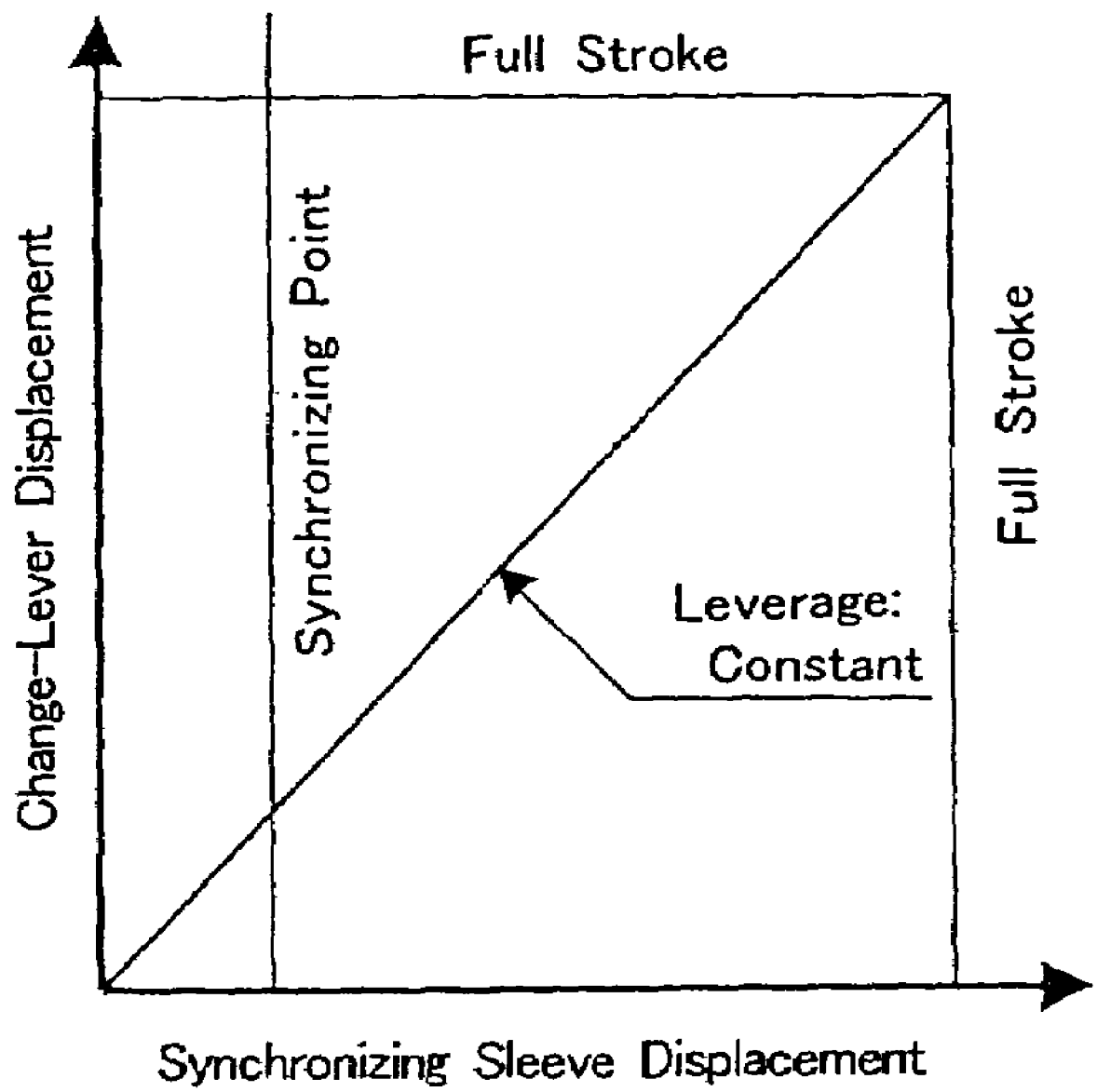
FIG. 7 is a graph describing a relation between the stroke of the synchro-sleeve and that of the change-lever, which strokes are observed during the shift operation in a prior-art gear-shifting device.

As a contrast to what is described in FIG. 6, FIG. 7 shows a relation between the stroke of the synchro-sleeve and that of the change-lever observed during the operation of the change-lever in a prior-art gear-shifting device, which is equipped with a conventional shift arm. In this case, the leverage is invariable throughout the operation of the change-lever without any consideration of the passing of the synchro-sleeve over the synchronization point, so the inclination of the line in the graph is constant.

The above embodiment according to the present invention is an example in which the top part of the shift arm is designed to change the leverage of the shift operation between two values. However, the present invention is not limited to this. Of course, the shift arm may be designed to vary the leverage among three values.

As described above, in the gear-shifting device according to the present invention, the top part of the shift arm, which engages with a shift piece to shift a corresponding shift fork shaft with a shift fork, is designed to have a compound arc figure, which comprises a plurality of combined arcs having different curvature radii. By this arrangement, the leverage of the device from the change-lever to the shift fork is variable while the change-lever is being operated to rotate the shift arm for shifting the shift fork.

As a result, a relatively large leverage available in the initial stage of the operation of the change-lever makes a relatively small force applied by the driver for a gear shift act on the shift fork as a large force. This ensures the synchronization of the synchromesh mechanism. On the other hand, during the shift operation of the driver, the leverage changes to a lower value at the completion of the synchronization, so the relatively short displacement of the change-lever L thereafter for the completion of the stroke achieves a sufficient displacement for the shift fork to complete the actuation. Therefore, the stroke of the change-lever in the gear-shifting device according to the present invention is still made equal to that of a prior-art gear-shifting device, so the present invention does not require an increase in the installation space of the change-lever in the interior of the vehicle.

In addition, it is preferable that the point where the leverage changes from a larger value to a smaller value be set after the point of the synchronization of the synchromesh mechanism. In this way, the rate of the displacement of the shift fork to that of the change-lever is increased after the synchronization so as to quickly bring the gear into engagement. As a result, the reaction that is generated at the time of the gear meshing in the synchromesh mechanism is reduced in frequency and in magnitude. This is an advantage because the reaction is generally referred to as "two-step engaging load", which is uncomfortable to the driver, who is operating the change-lever.

What is claimed is:

1. A gear-shifting device for a manual transmission in which an operational force applied at a change-lever for a shift operation is transmitted selectively to actuate a synchro-sleeve for a gear shift;

wherein:

said gear-shifting device comprises a shift arm, which is rotatable in correspondence to said shift operation of said change-lever, and a shift piece, which is in contact with said shift arm and is capable of shifting in response to said rotation of said shift arm;

said shift arm having heteromorphous cams at a contacting part thereof, wherein said cams are in contact with said shift piece and wherein said heteromorphous cams have at least two different cam profiles which contact a same surface of said shift piece; and while said shift arm is rotating in correspondence to said shift operation, a distance between said contacting part and a rotational axis of said shift arm varies to change a leverage effective between said change-lever and said contacting part.

2. The gear-shifting device for a manual transmission, as set forth in claim 1, wherein:

while said change-lever is being operated from a neutral position to a geared position, said leverage becomes smaller halfway through the operation.

3. The gear-shifting device as set forth in claim 1 or 2, wherein:

said shift piece is provided with an approximately U shaped selector groove; and said contacting part of said shift arm is fitted in said selector groove.

4. The gear-shifting device as set forth in claim 1 or 2, wherein:

said shift arm is mounted on a shift selector shaft, which is rotated in correspondence to the shift operation of said change-lever.

5. The gear-shifting device for a manual transmission, as set forth in claim 1 or 2, wherein:

said manual transmission comprises a plurality of speed-change gears and a synchromesh mechanism, which synchronizes said synchro-sleeve and one of said speed-change gears by pushing said synchro-sleeve onto said speed-change gear; and said leverage is maximum at a time of synchronization by said synchromesh mechanism.

6. The gear-shifting device for a manual transmission, as set forth in claim 5, wherein:

said heteromorphous cams have a compound arc figure, which comprises a plurality of combined arcs having different curvature radii; and said leverage changes to a smaller value when said contacting part transits from a surface defined by one arc to a surface defined by another arc among said arcs in response to the rotation of said shift arm after the synchronization.

* * * * *

UNITED STATES PATENT AND TRADEMARK OFFICE
CERTIFICATE OF CORRECTION

PATENT NO.      : 7,597,024 B2                                    Page 1 of 1
APPLICATION NO. : 10/562482
DATED           : October 6, 2009
INVENTOR(S)     : Kenji Matsuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Twenty-eighth Day of September, 2010

David J. Kappos
*Director of the United States Patent and Trademark Office*